(12) United States Patent
Handa

(10) Patent No.: US 7,938,149 B2
(45) Date of Patent: *May 10, 2011

(54) SUPPLEMENTAL HEAT EXCHANGE FOR HIGH PRESSURE GAS TANK

(75) Inventor: Kiyoshi Handa, Tochigi (JP)

(73) Assignee: Honda Motor Co, Ltd, Tokyo (JP)

( * ) Notice: Subject to any disclaimer, the term of this patent is extended or adjusted under 35 U.S.C. 154(b) by 1032 days.

This patent is subject to a terminal disclaimer.

(21) Appl. No.: 11/695,194

(22) Filed: Apr. 2, 2007

(65) Prior Publication Data

US 2008/0216487 A1    Sep. 11, 2008

Related U.S. Application Data

(63) Continuation-in-part of application No. 11/682,574, filed on Mar. 6, 2007, now Pat. No. 7,735,528, which is a continuation-in-part of application No. 11/279,574, filed on Apr. 13, 2006, now Pat. No. 7,377,294, and a continuation-in-part of application No. 11/380,429, filed on Apr. 27, 2006, now Pat. No. 7,637,292, and a continuation-in-part of application No. 11/381,005, filed on May 1, 2006, now Pat. No. 7,681,604, and a continuation-in-part of application No. 11/380,996, filed on May 1, 2006, now Pat. No. 7,757,726, and a continuation-in-part of application No. 11/687,905, filed on Mar. 19, 2007, now Pat. No. 7,891,386.

(51) Int. Cl.
*B65B 1/04* (2006.01)

(52) U.S. Cl. .......................................................... 141/82

(58) Field of Classification Search .................... 141/82, 141/2, 18, 98, 286, 67; 62/50.1–50.5; 123/525; 137/255, 263; 272/146.1, 146.6
See application file for complete search history.

(56) References Cited

U.S. PATENT DOCUMENTS

| | | | | |
|---|---|---|---|---|
| 5,370,159 | A * | 12/1994 | Price | 141/4 |
| 7,377,294 | B2 * | 5/2008 | Handa | 141/82 |
| 7,735,528 | B2 * | 6/2010 | Handa | 141/82 |
| 2007/0000561 | A1 * | 1/2007 | Handa | 141/82 |

* cited by examiner

*Primary Examiner* — Steven O Douglas
(74) *Attorney, Agent, or Firm* — Mark E. Duell; Porter Wright Morris & Arthur, LLP

(57) ABSTRACT

Apparatus for heat exchange in a high pressure gas storage tank wherein a heat absorbent gas media circulates within the tank and absorbs or radiates the heat resulting from compression and expansion of gas stored in the on board tank depending upon the mode of operation of the vehicle, the gas media is circulated through a heat exchange unit external to the tank whereby heat is radiated to or absorbed from an environment external to the tank, and an in situ heat exchange device installed within the tank absorbs or radiates the heat from or to the gas stored in the tank as a result of heat exchange through a unit external to the tank.

18 Claims, 18 Drawing Sheets

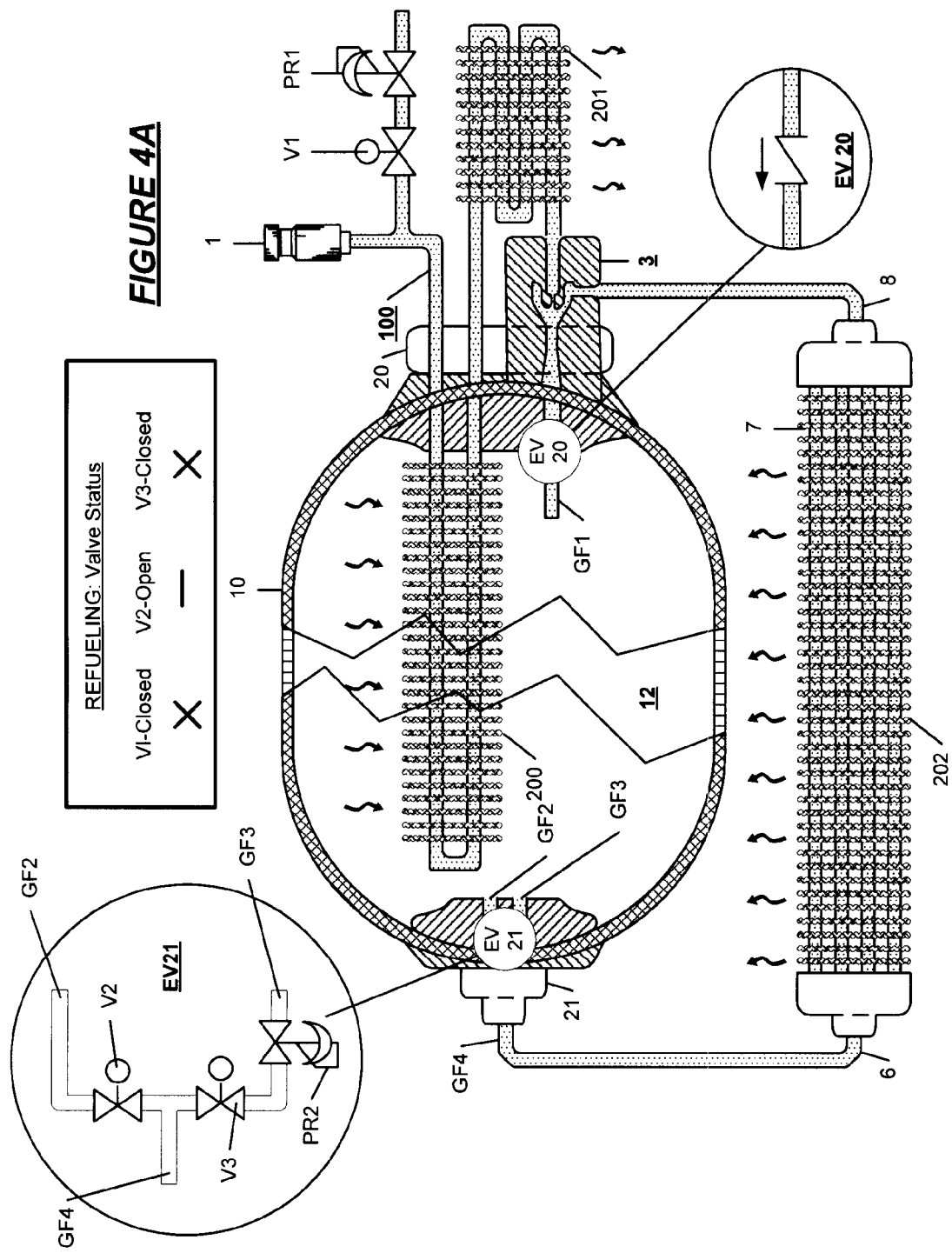

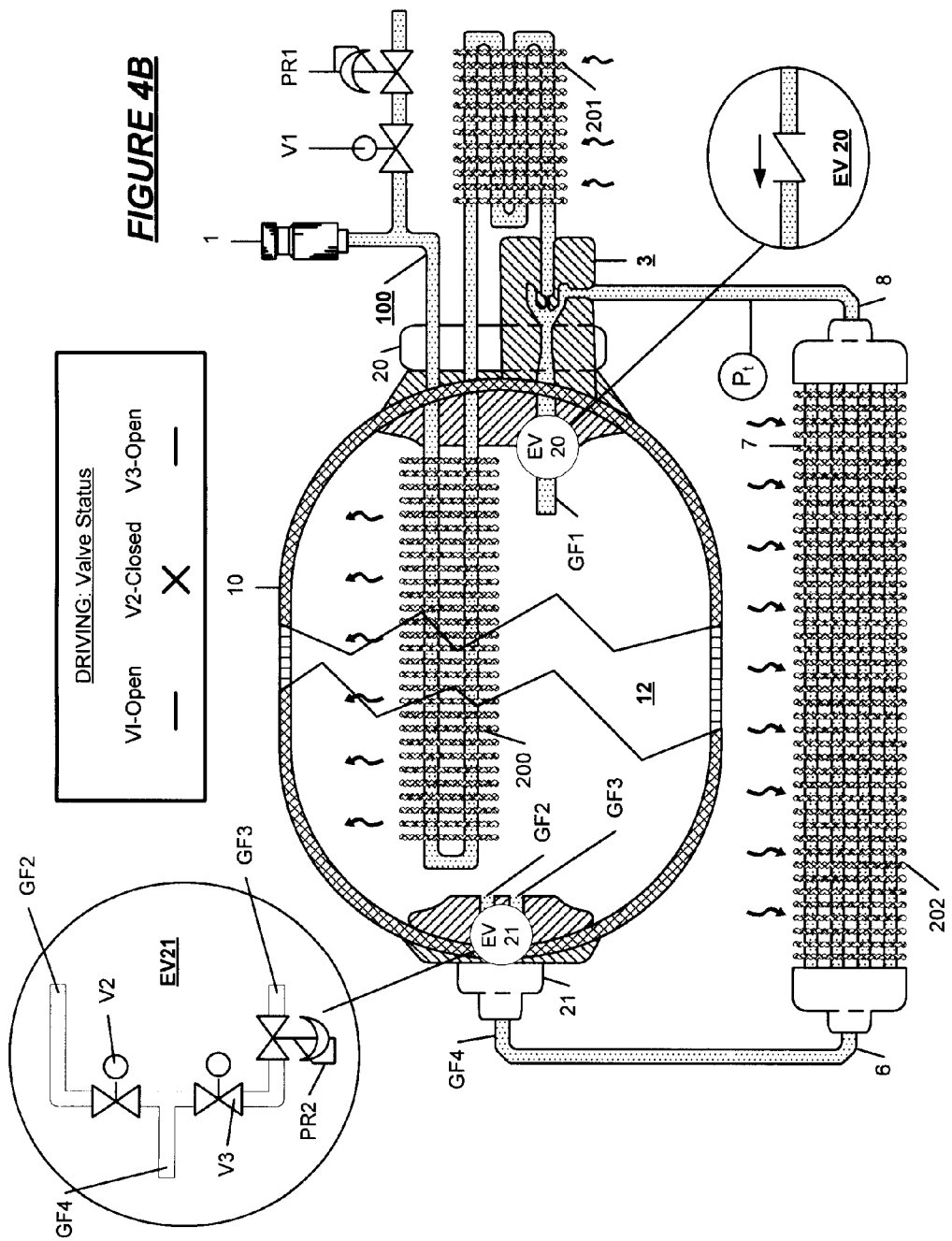

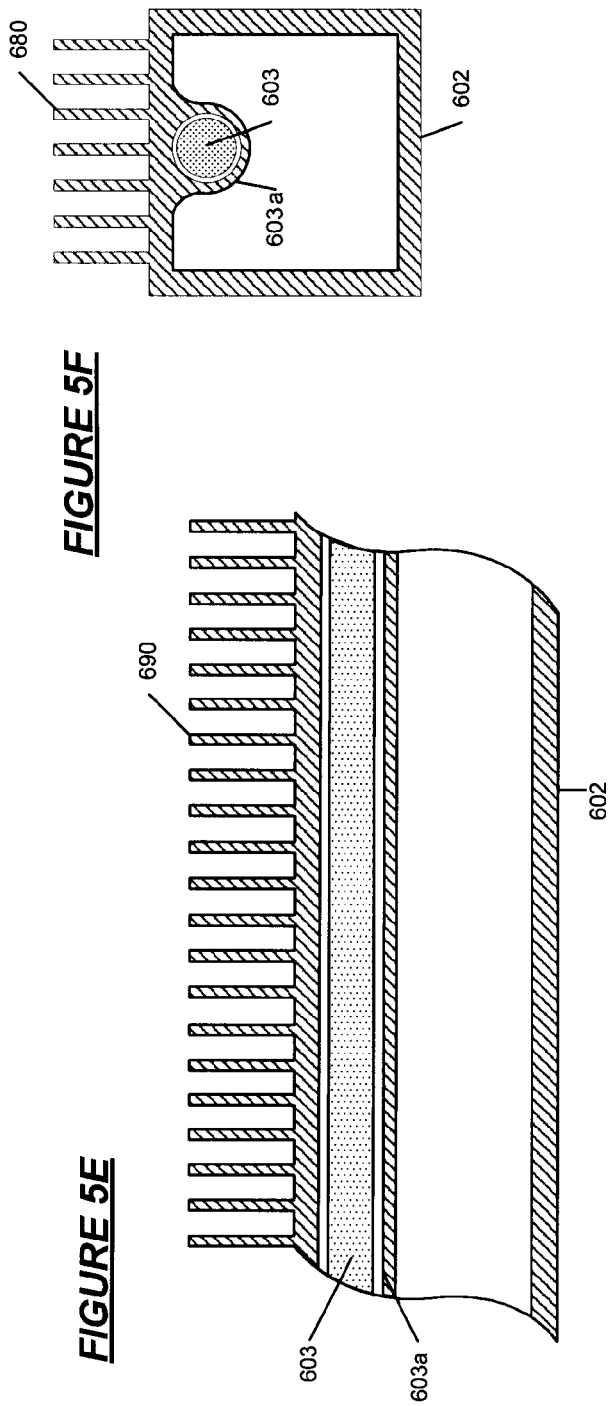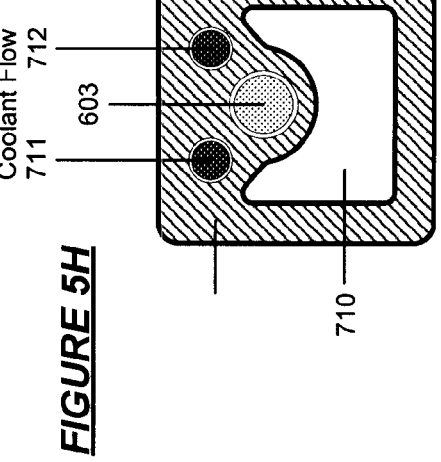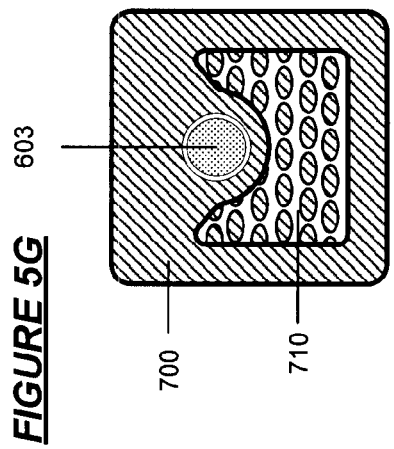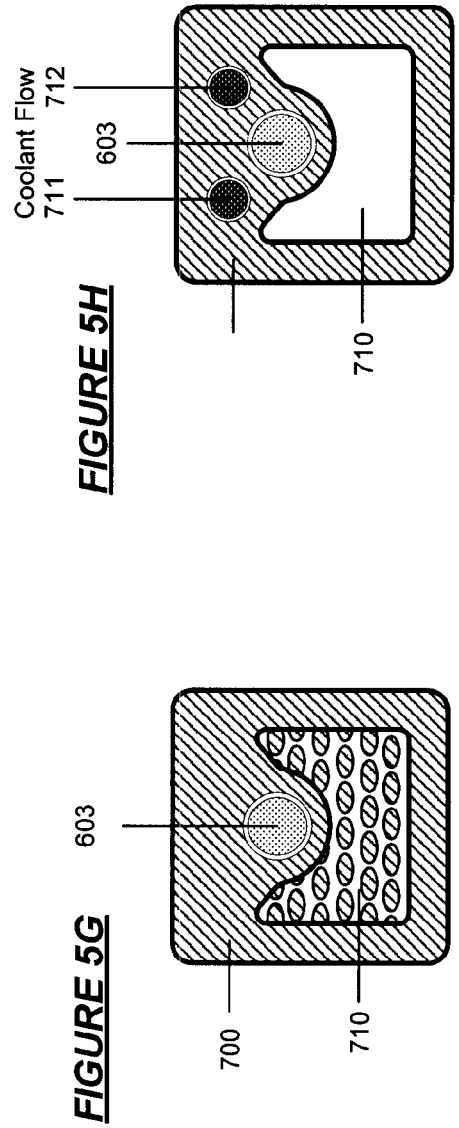

SUPPLEMENTAL HEAT EXCHANGE FOR HIGH PRESSURE GAS TANK

RELATED APPLICATIONS

This application is a continuation in part of my applications for U.S. Letters Pat. Ser. No. 11/682,574 filed Mar. 6, 2007, now U.S. Pat. No. 7,735,528, which is a continuation in part of U.S. patent application Ser. No. 11/279,574, filed Apr. 13, 2006, now U.S. Pat. No. 7,377,294, U.S. patent application Ser. No. 11/380,429 filed Apr. 27, 2006, now U.S. Pat. No. 7,637,292, U.S. patent application Ser. No. 11/381, filed May 1, 2006, now U.S. Pat. No. 7,681,604, and U.S. patent application Ser. No. 11/380,996 filed May 1, 2006, now U.S. Pat. No. 7,757,726; and U.S. patent application Ser. No. 11/687,905 filed Mar. 19, 2007 now U.S. Pat. No. 7,891,386, which is a continuation in part of U.S. Pat. No. 7,735,528.

FIELD OF THE INVENTION

The present invention relates to a system for cooling and heating high pressure gas stored in fuel tanks, typically, hydrogen gas and compressed natural gas introduced into a vehicle tank. Onboard high pressure tank cooling is effected by direct gas ejecting using a Venturi pump or another mechanical pump to circulate refill gas to absorb heat within the tank and to exchange heat with an environment external to the tank. The invention supplements the circulating gas heat exchange with an in situ heat exchange device within the tank for heat absorption and radiation with respect to the gas depending upon the mode of vehicle operation.

BACKGROUND OF THE INVENTION

In motor vehicles using hydrogen or using compressed natural gas (CNG) to power vehicle engines, present practice is that fuel is stored in on board tanks maintained at a maximum pressure in the range of about 5000 psi for hydrogen and 3600 psi for CNG. Higher pressures in the range of about 10,000 psi or more are anticipated as the use of hydrogen (for fuel cells) and hydrogen and CNG (for internal combustion engines) becomes more prevalent. The in situ techniques I have developed to the manage thermal energy differences between high pressure gas in a tank and the environment of the tank in a vehicle involve heat exchange devices fixed within the tank (to absorb and radiate heat) operatively interconnected with an external heat exchanger (correlatively to radiate and absorb heat) in the sequence of the refill and exhaustion of the high pressure gas within the tank. In the specification herein, high pressure hydrogen and high pressure CNG (compressed natural gas) are both referred to as a "gas" or "high pressure gas." Both hydrogen and CNG are high pressure gases with which the invention is useful, typically, but not necessarily, in motor vehicle applications.

When the on board fuel tanks of a hydrogen powered vehicle are filled with hydrogen, the pressurized on board gas in the tanks may be characterized as having multiple forms of energy: 1) chemical energy associated with the hydrogen fuel itself (consumed in powering the vehicle), and 2) thermodynamic energy, namely, the mechanical, thermal and internal energy associated with the physics of high pressure refueling of a tank from sources of fuel at the high pressure gas refuel depot. Depletion of fuel from the tanks, although at a slower flow rate release the energy stored and thermally cools gas consumed during vehicle operation.

OBJECTS OF THE INVENTION

It is an object of the invention to minimize tank heating and to increase the efficiency and refueling capacity of an on board fuel storage tank in a hydrogen powered motor vehicle. It is an object of the invention to minimize high pressure gas tank heating and to increase the efficiency and refueling capacity of an on board fuel storage tank in high pressure gas powered motor vehicles. It is an object of the invention to provide a system that can remove the compression heat resulting from refueling an on board tank during high pressure refueling. An avoidance of secondary gas cooling pretreatment and/or pressure overfill, a speedier refueling time, increased refueling efficiency, and an extension of overall vehicle range will result. Improved tank capacity per unit volume is achieved during refilling, particularly where nominal refill pressure is in the range of about 10,000 psi or greater for hydrogen and about 3,600 psi for CNG. Additionally, the system may be operated in the inverse to provide gas warming for use in cold climates and to compensate for gas cooling as the tank is depleted during driving. Vehicle range is thereby increased.

SUMMARY OF THE INVENTION

In accordance with the present invention, effective reduction of fuel tank heating during the refueling process is provided by introducing the refueling gas into a Venturi (or ejector) pump system that sucks out the hot gas from within the tank and in a circuit introduces the hot gas into a heat exchanger where the gas is then cooled down. The cooled gas and the refueling gas are mixed in the ejector and then both gas streams are directed into the vehicle storage tank. Alternatively, a mechanical circulation system may utilize the flow of gas in a circuit to absorb and dispose of excess heat associated with refueling.

The system described herein provides onboard cooling and reduces the cost and weight of on board cooling equipment. Cooling capacity is improved; continuous cooling is provided. Heat exchange efficiency approaches 100%. When there is an internal heat exchanger, the gas temperature in the heat exchanger is not perfectly equal to tank gas temperature, thus reducing internal heat exchanger efficiency to less than 100%. In the gas ejector system described herein, the gas flow cooling circuit, through an in situ device or a Venturi pump is interconnected with an external heat radiator or a vehicle sub cooling system such as an air conditioner, thereby collecting interior tank heat and radiating the absorbed heat into the ambient atmosphere or other system appropriate for the use, radiation, absorption, or disposal of the collected heat of high pressure refueling.

The invention is described more fully in the following description of the preferred embodiment considered in view of the drawings. As is evident from the context of the particular drawing figures, the figures are generally shown in cross section format:

BRIEF DESCRIPTION OF THE SEVERAL VIEWS OF THE DRAWINGS

FIG. 4A, FIG. 4B, and FIG. 4C respectively depict embodiments of the invention utilizing an ejector pump circulator and in situ and first and second supplemental heat exchange devices particularly showing tank valve configurations in the gas flow circuit during the states in which the tank is being refilled (FIG. 4A), during driving (FIG. 4B) and while the vehicle is parked (FIG. 4C).

Vehicle sub frame cooling systems are shown in FIG. 5A, FIG. 5B, FIG. 5C, FIG. 5D, FIG. 5E, FIG. 5F, FIG. 5G and FIG. 5H illustrate examples of heat exchange interconnections and assemblies for sub frame cooling and heating.

Figure 6A:
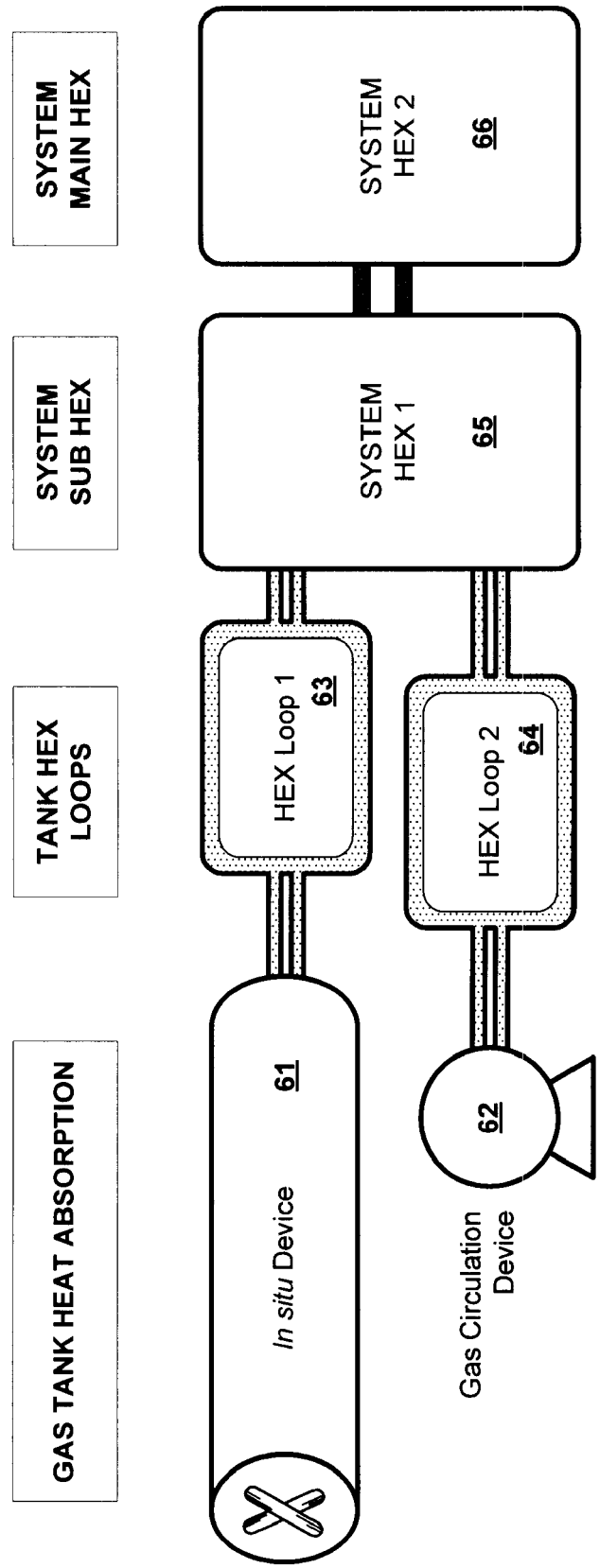
Figure 6B:
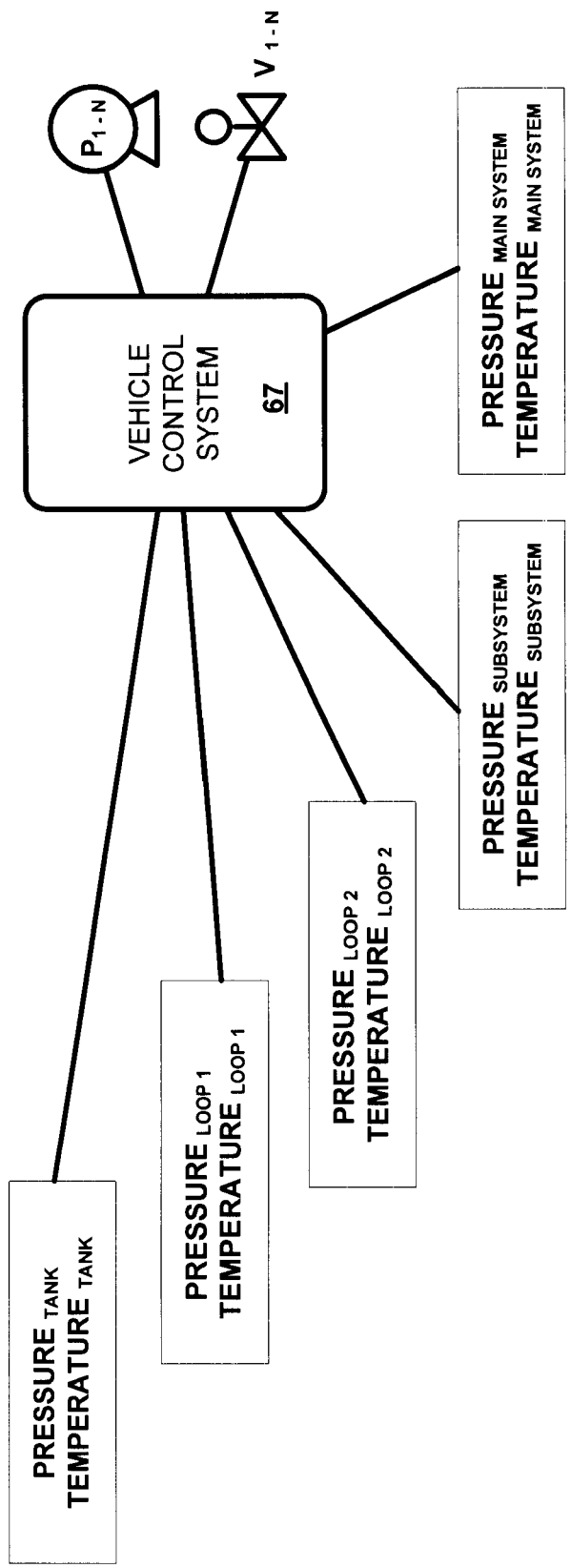

FIG. 6 is a chart showing the cooling management system for a high pressure tank involving the multiple and separate elements of heat transfer in the system of the invention.

Figure 7A:
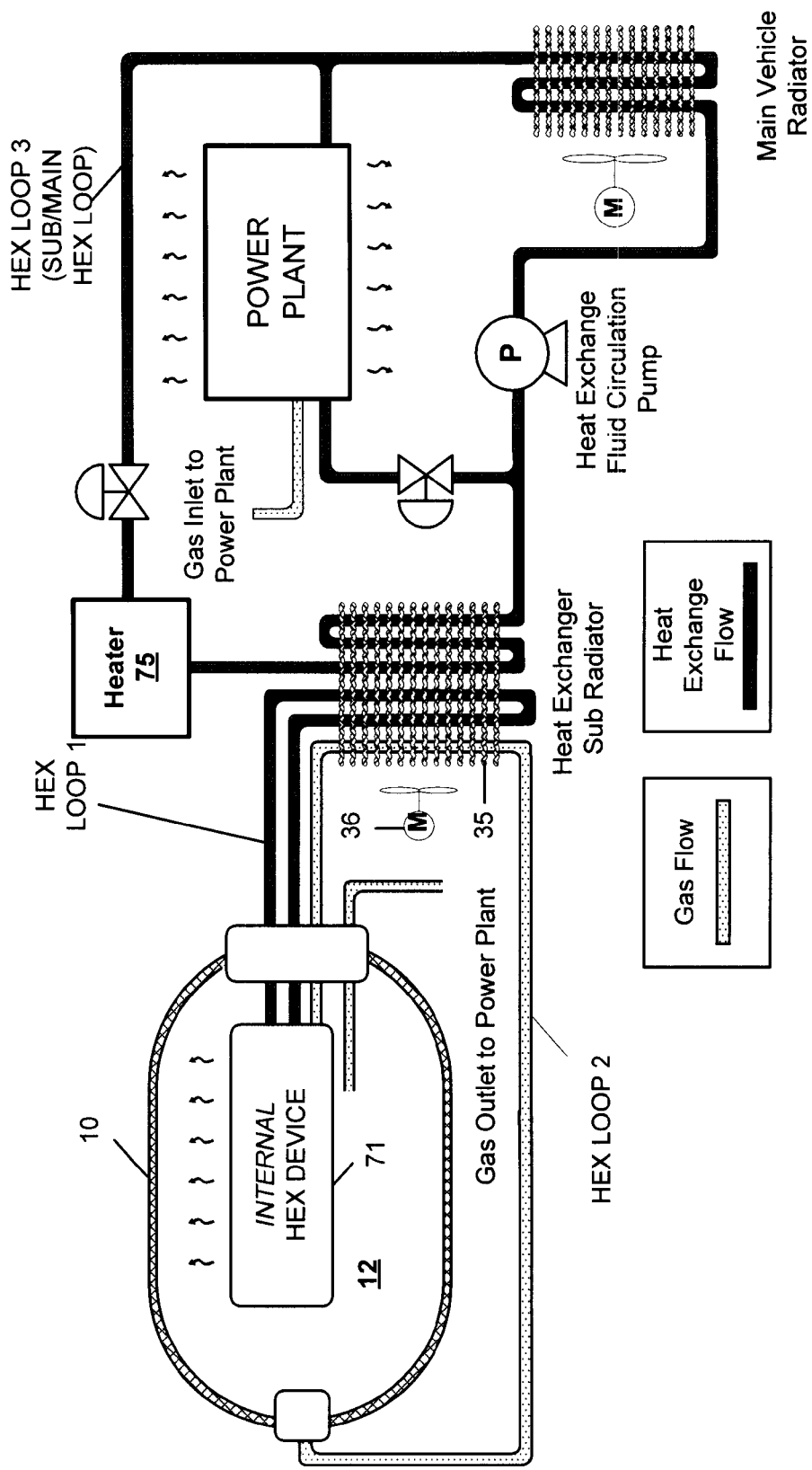
Figure 7B:
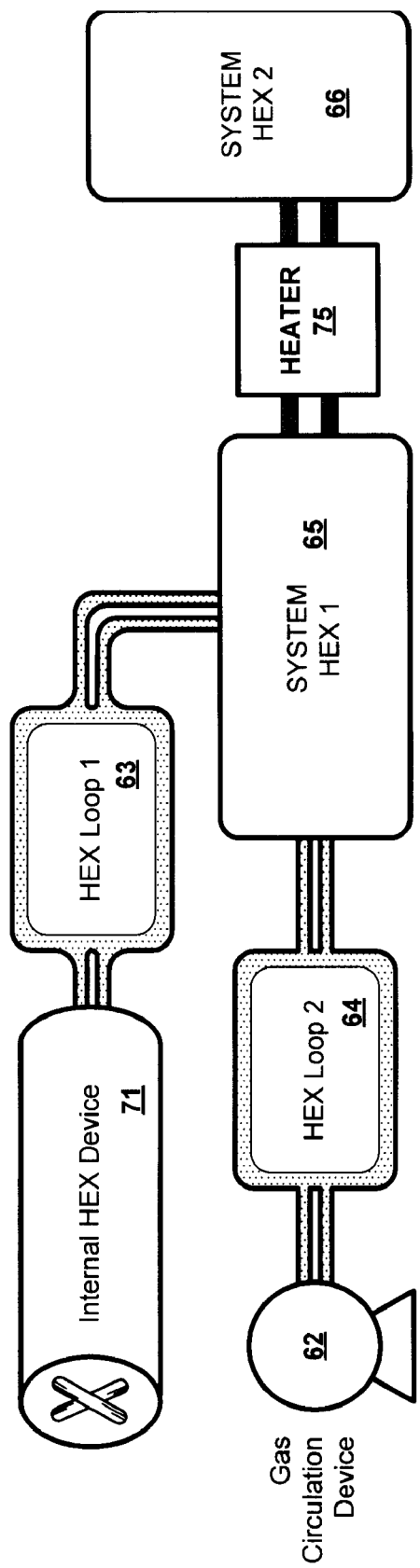
Figure 7C:
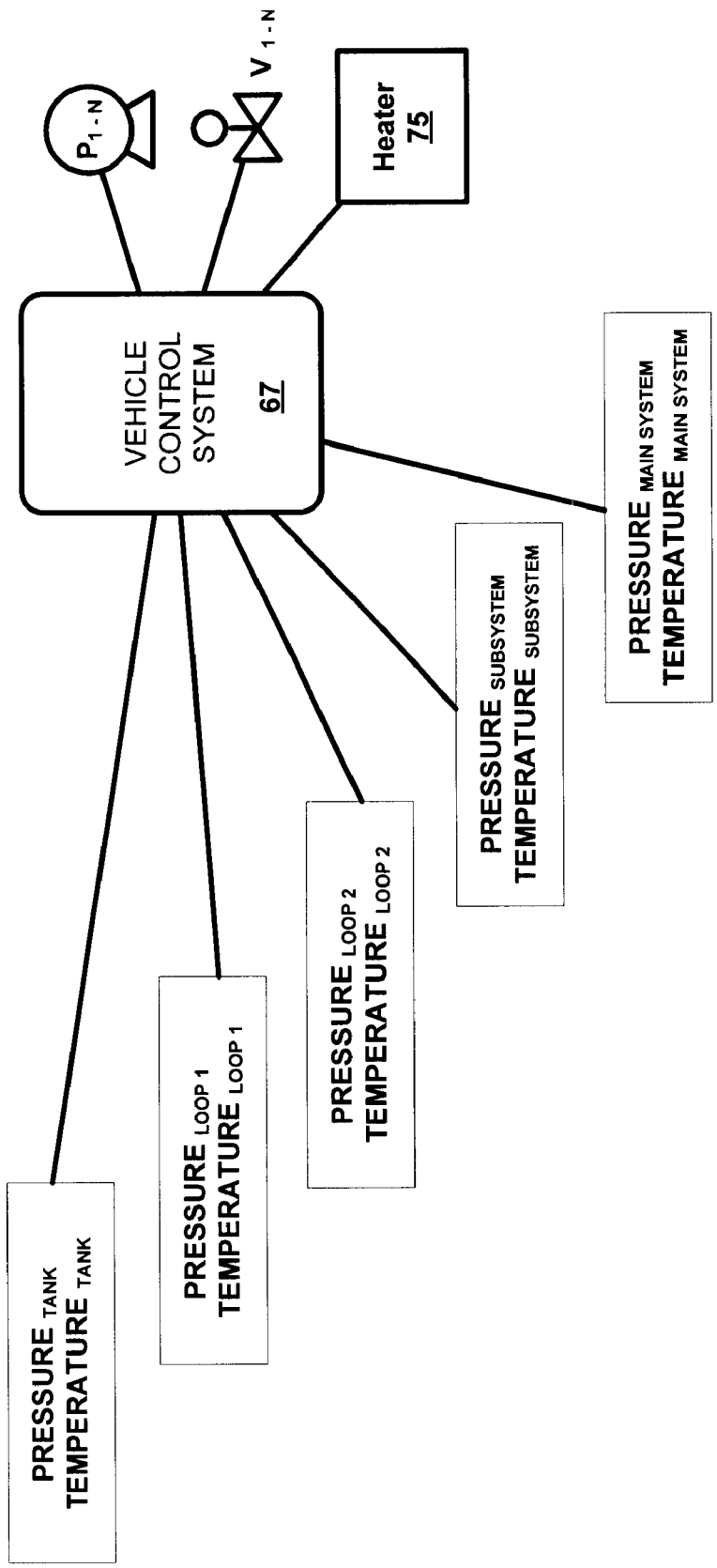

FIG. 7A, FIG. 7B and FIG. 7C show the system utilized in an application for gas warming.

DETAILED DESCRIPTION OF THE INVENTION

The invention comprises apparatus for heat exchange in a high pressure gas storage tank wherein a heat absorbent gas media circulates within the tank and absorbs or radiates the heat resulting from compression and expansion of gas stored in the on board tank depending upon the mode of operation of the vehicle, the gas media is circulated through a heat exchange unit external to the tank whereby heat is radiated to or absorbed from an environment external to the tank, and an in situ heat exchange device installed within the tank absorbs or radiates the heat from or to the gas stored in the tank as a result of heat exchange through a unit external to the tank.

Figure 1A:
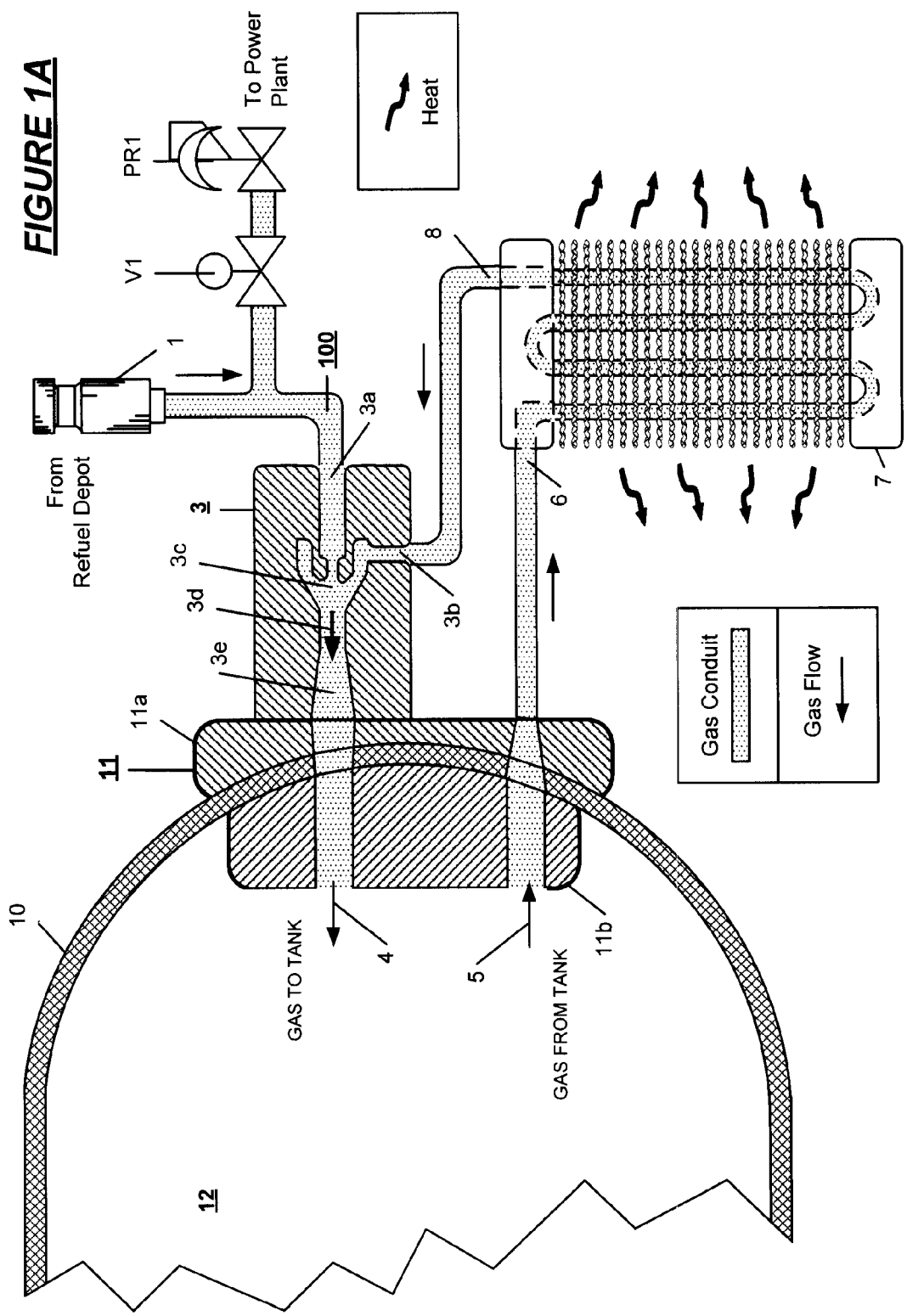
FIG. 1A is a representational diagram showing an example of a cooling system using an ejector pump fixed at one end of a fuel storage tank wherein gas flow is interconnected to an external radiator.

With reference to FIG. 1A an example of a cooling system using an ejector pump fixed at one end cap or port assembly 11 comprised of mating elements 11a and 11b of a fuel storage tank 10 having interior gas storage volume 12 is shown. An ejector pump 3 is disposed at the end port cap assembly providing a gas flow circuit 100 within the system from the refill depot receptacle 1. Fuel depot receptacle 1 is interconnected with a control for gas flow into the vehicle tank during refill and insures that the system is otherwise closed at all other times. The master gas flow conduit system in the vehicle from the refuel inlet through the ejector pump and heat exchanger to the tank is indicated by 100. At refill, gas flow from the refill depot, indicated by arrows→, enters the tank volume 12 through inlet 4. Gas is introduced into ejector pump 3 which sucks up the introduced hot gas from the tank interior through tank gas flow outlet 5. Ejector pump 3 is configured to provide gas flow from the inlet 3a whereby jet throat 3d follows the nozzle 3c that leads from the inlet 3a. The pump diffuser 3e is disposed to introduce gas from the pump into the tank interior through gas flow conduit 4 in the tank. The suction inlet for gas flow to the pump is shown at 3b. The gas flow is interconnected to inlet 6 of a complimentary external radiator or heat exchanger 7 and passes through outlet 8 returning to the ejector pump and flows to the tank interior 12 through tank entrance 4. A gas outlet for directing the flow of gas to the power plant while the vehicle is in operation is shown at valve V1 and pressure regulator PR1. Heat disposal from the heat exchanger is indicated by the arrows ⟿. The compression heat of high pressure refill is thereby absorbed by the gas itself which circulates within the loop 100 and is radiated from the cooling/refueling circuit to an external environment such that a close to optimum refill of the tank is achieved with or without a slow fill, precooling or pressure overfill.

Figure 1B:
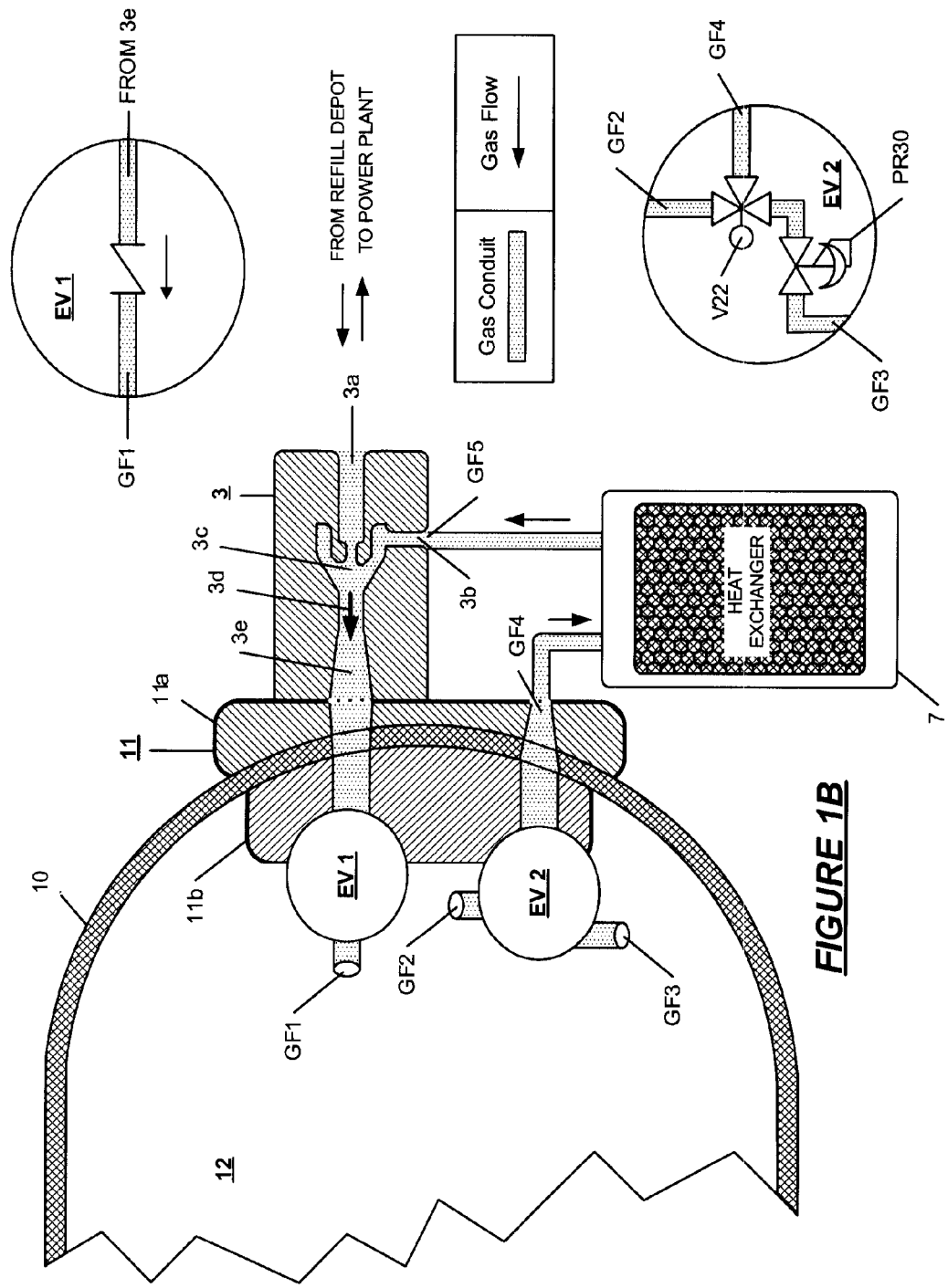
FIG. 1B shows an embedded valve system utilized in a cooling system of FIG. 1A.

In FIG. 1B, the valves and regulators embedded in the end caps of the embodiment are indicated as EV1 and EV2. EV1 is shown in further detail as a check (or one way flow) valve leading to gas flow opening GF1 in the tank. Assembly EV2 includes two way switching valve V22 and pressure regulator PR30 leading to gas flow openings GF2, GF3 and GF4. Heat exchanger 7 is shown in the gas flow circuit receiving gas from the tank through GF4 and introducing cooled gas into the ejector pump through opening GF5.

Figure 2A:
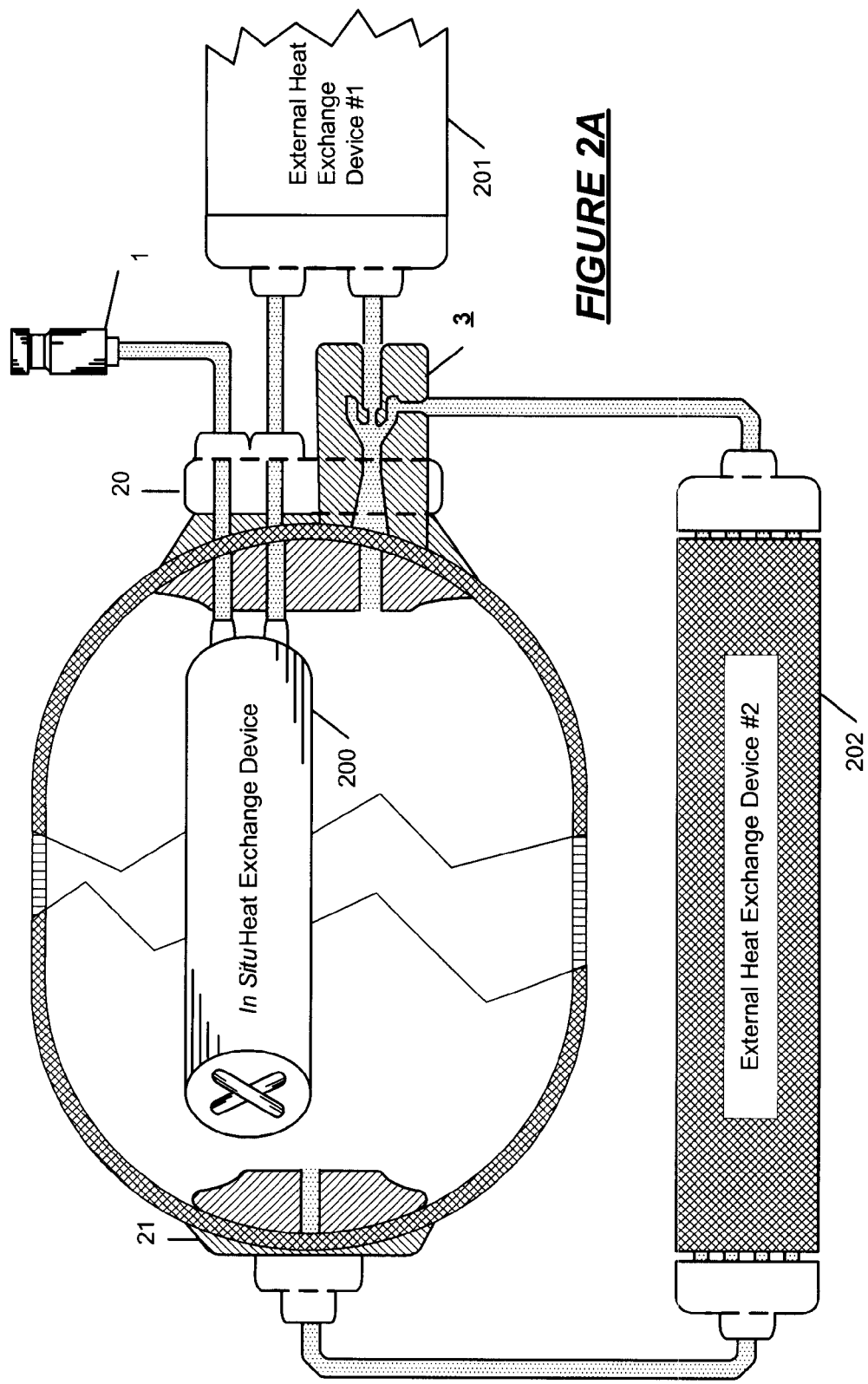
FIG. 2A depicts an embodiment of the invention utilizing an ejector pump to direct gas flow including interconnected circuits for gas flow from the refill depot through (1) an in situ device, (2) a first external heat exchange device and (3) a second external heat exchange device.
Figure 2B:
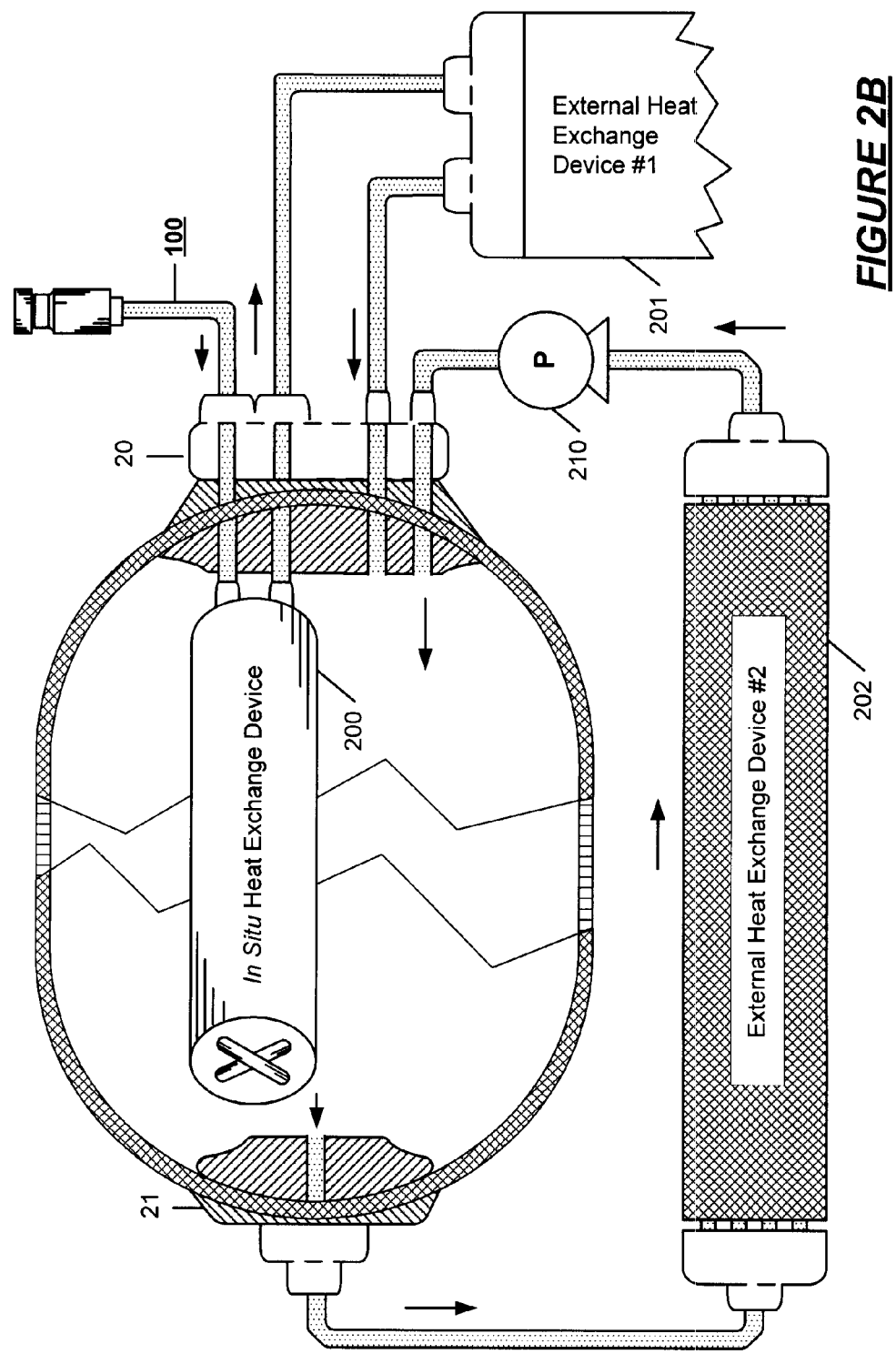
FIG. 2B depicts an embodiment of the invention otherwise shown in FIG. 2A wherein a powered pump is utilized in place of the gas powered ejector pump.

In FIG. 2A a port assembly is adapted to each opposite end of the tank in a configuration wherein gas introduced from refill depot 1 circulates in a loop through in situ device 200, first external heat exchanger 201 and second external heat exchanger 202 before being introduced into the tank. The ejector pump is indicated at 3. In FIG. 2B, a port assembly is similarly adapted to each opposite end of the tank in a configuration wherein gas introduced from refill depot 1 circulates in a loop through in situ device 200, first external heat exchanger 201 and second external heat exchanger 202 before being introduced into the tank. The gas flow pump 210 may be mechanically powered by turbine flow of the high pressure gas, by an electrically powered pump, or by interconnection to the vehicle power plant mechanicals.

EXAMPLE I

Supplemental Cooling

Figure 3A:
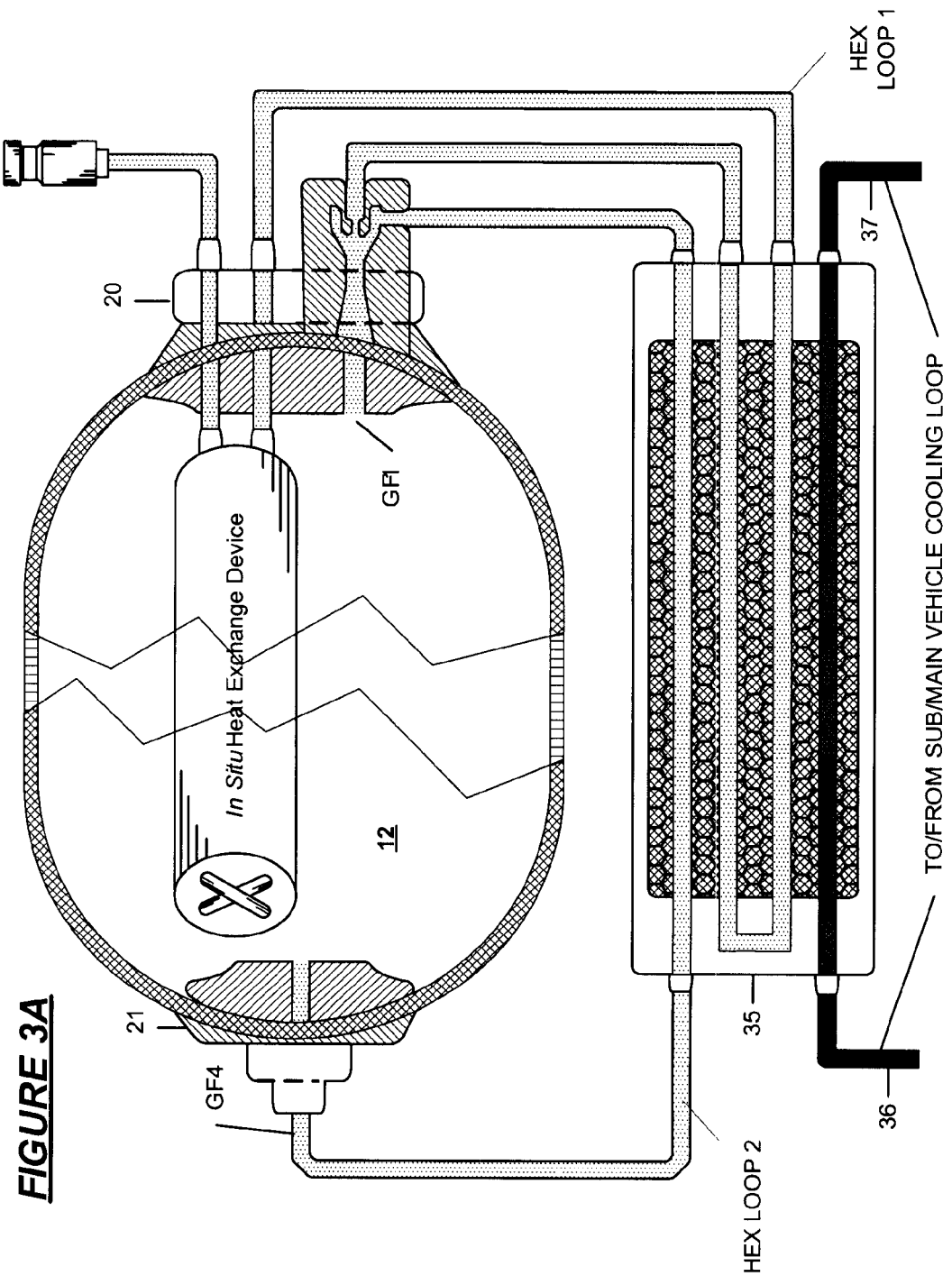
FIG. 3A illustrates a system of the invention in which the heat exchange devices utilized in the gas flow circuit are thermally interconnected for the disposition of the heat absorbed by the circulating gas to a main or sub vehicle cooling system.
Figure 3B:
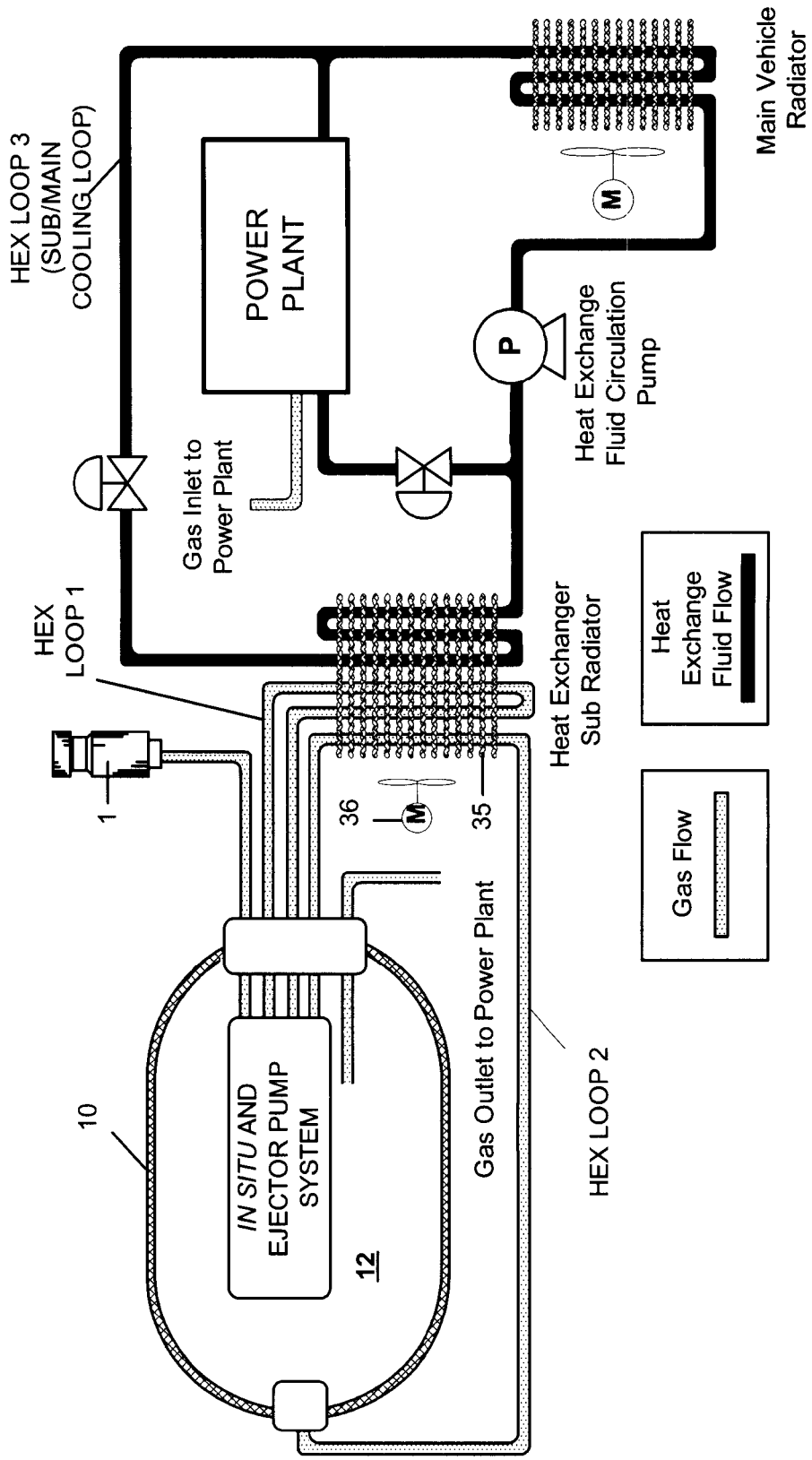
FIG. 3B shows in further detail the interconnection of the gas cooling circuit loops to a vehicle subsystem cooler or to the main vehicle power plant cooling system.
Figure 3C:
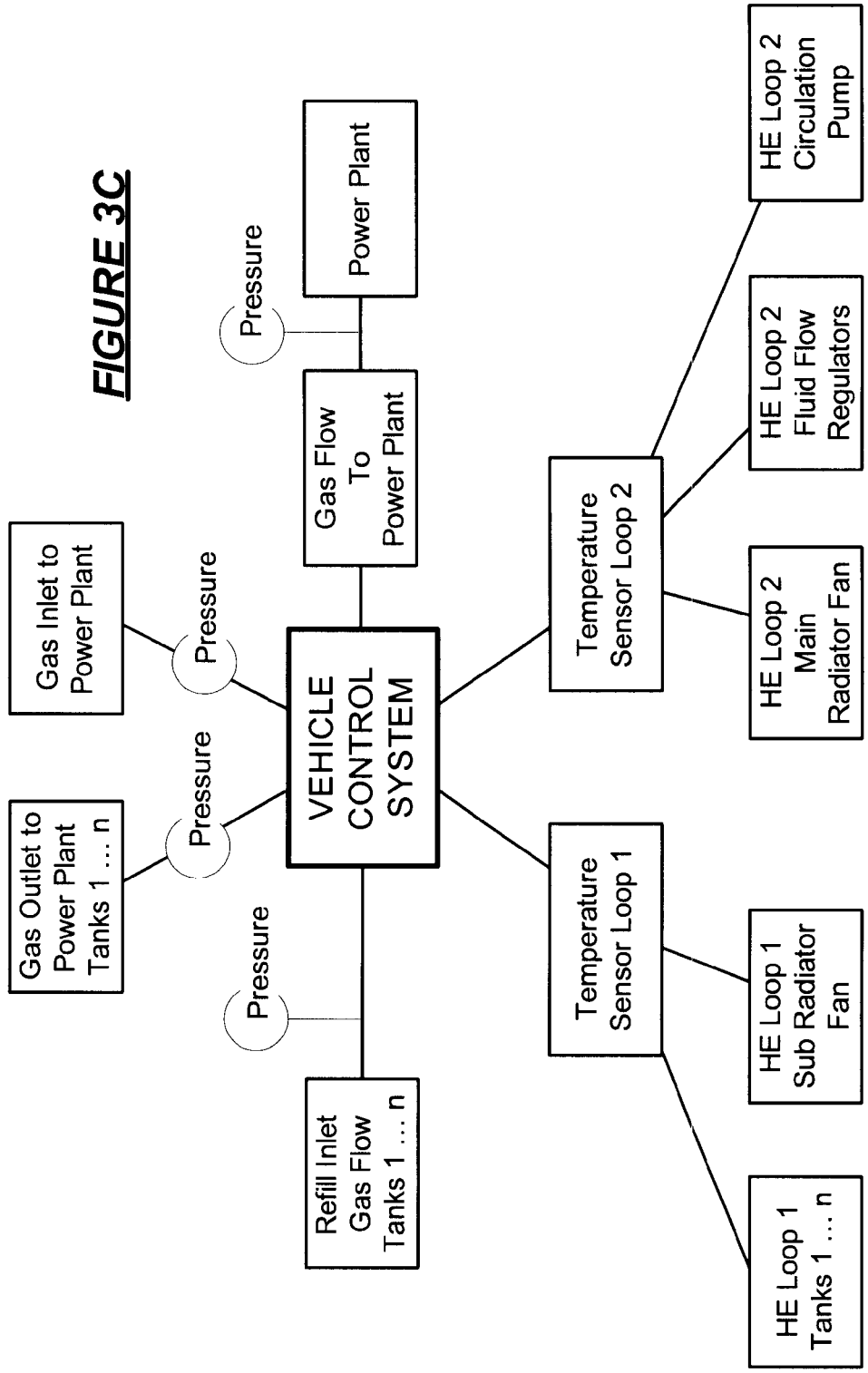
FIG. 3C illustrates a control and monitoring system used with a system described in FIG. 3B.

FIG. 3A illustrates the common disposition of first gas flow heat exchange loop passing through the in situ device HEX LOOP 1 and second gas flow heat exchange loop HEX LOOP 2 passing through the tank into the same external heat exchanger or radiator 35 where the heat may be dissipated in place or further cooled by a thermal interconnection with a main or sub vehicle cooling system trough an interconnection by inlet 36 and outlet 37. FIG. 3B shows the interconnection of HEX LOOP 1 and HEX LOOP 2 passing through radiator 35 interconnected with HEX LOOP 3, the vehicle power plant main or subsystem cooling loop. Radiator 35 is thermally interconnected with cooling fan 36.

Figure 4C:
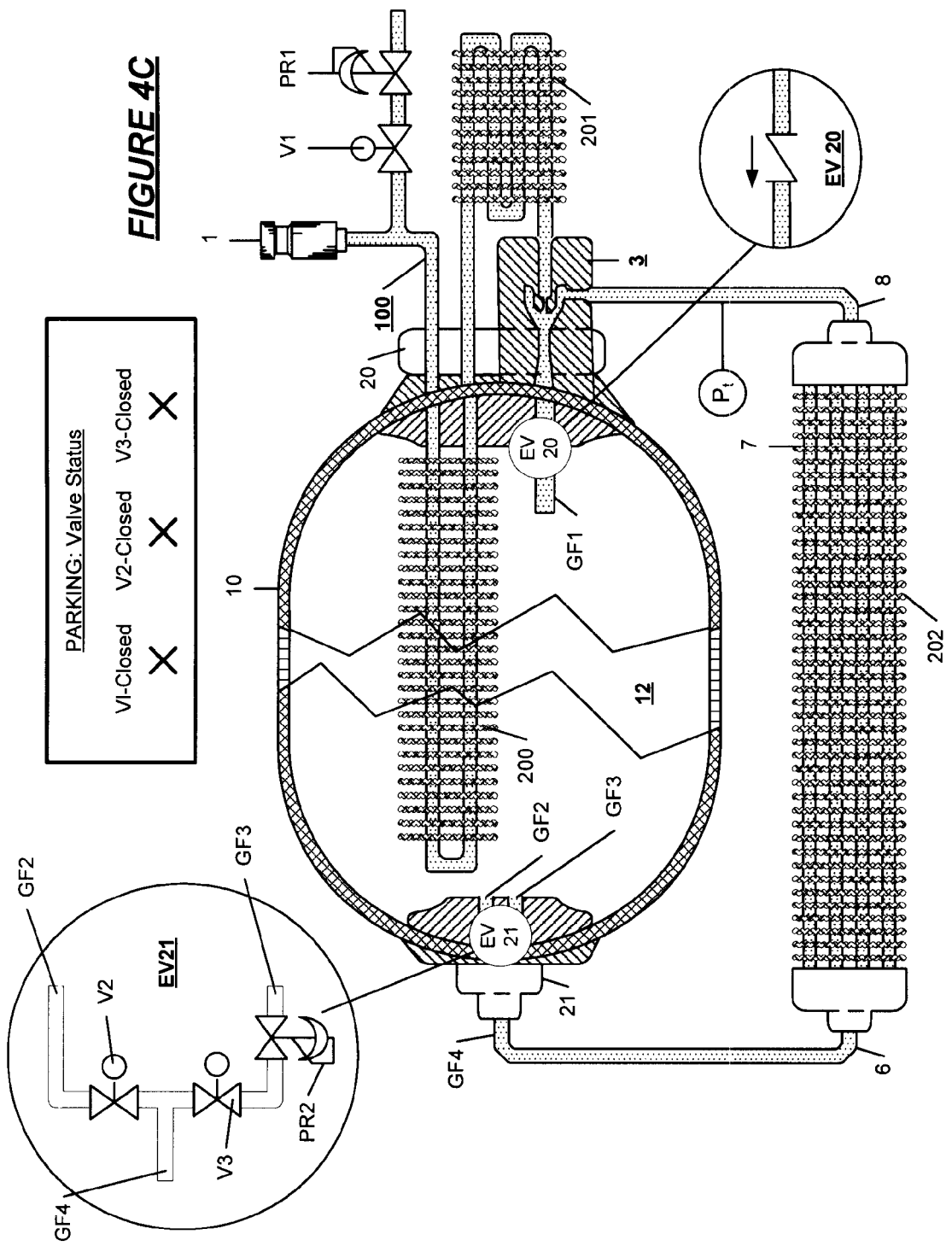

FIG. 4A, FIG. 4B and FIG. 4C illustrate, in a vehicle application, the respective modes: refilling, driving and parking. In each FIG. 4A, FIG. 4B and FIG. 4C, a valve/gas flow switching and pressure regulator is embedded in each of the end port assemblies 20 and 21 as EV 20 and EV 21. Heat exchanger 7, ejector pump 3 and its components, nozzle 3c, throat 3d and outlet 3e, and refill inlet system 1 are numerically designated as with equivalent elements shown similarly in FIG. 1A.

Figure 5B:
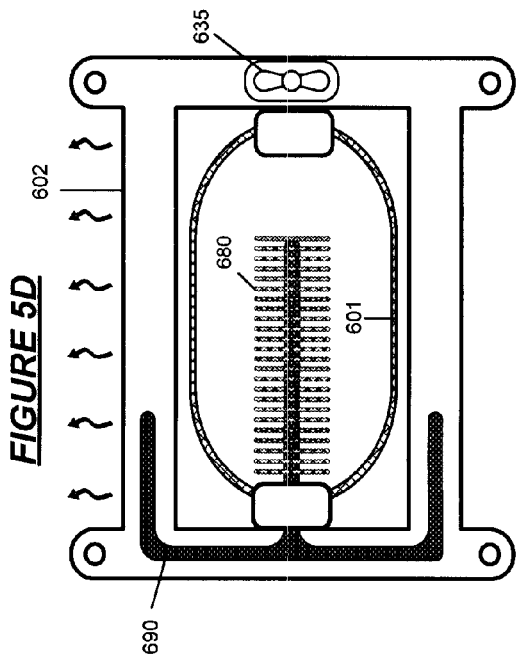
Figure 5D:
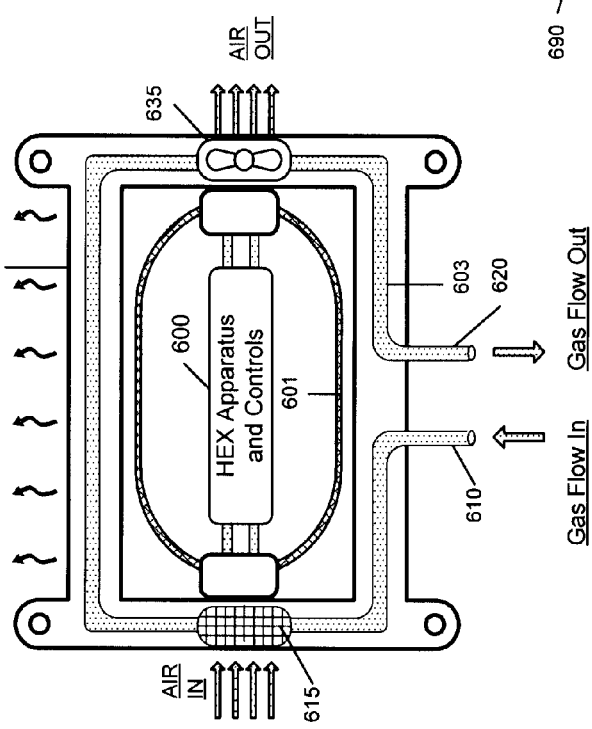
Figure 5A:
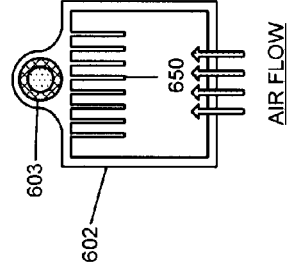

The heat exchanger shown in the embodiments may be supplemented or replaced by the vehicle sub frame cooling systems shown in FIG. 5A, FIG. 5B, FIG. 5C, FIG. 5D, FIG. 5E, FIG. 5F, FIG. 5G and FIG. 5H. FIG. 5A shows a circulating gas flow cooling line circuit 603 disposed within a vehicle frame component 602 surrounding tank 601 for circulating the gas within a conduit disposed with respect to the tank sub frame. Frame cooling media, which will typically be air, is received in frame inlet 615 and exhausted through an outlet which may include a fan 635 or other active means for removing heat from the gas in line 603. In a closed cooling circuit, gas flows within a continuous circuit from the fuel tank circulating system through an inlet and outlet wherein "Gas Flow In" 610 is matched with the heat exchanger connection 6; "Gas Flow Out" from the frame radiator 620 is matched with heat exchanger connection 8 and the gas returns to the tank gas circulation circuit. (Except as identifying flow in either direction, "in" and "out" designate the end connections of the circuit where the internal tank coils are connected to the radiator. Flow may be in either direction; flow direction through the radiator is not critical.)

Figure 5C:
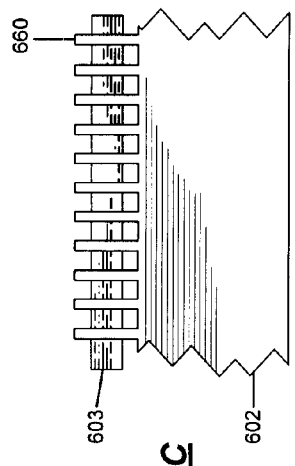

The heat from line 603 is optionally radiated externally by air circulating in the frame driven by fan 635. In the absence of an air flow system, the frame body itself may be utilized as a heat sink for radiating or absorbing heat. The circulating gas flow circuit tube 603 may be formed as an extruded or molded interior conduit; however, it is preferable, whether the tube is within, upon, or otherwise a component of the sub frame assembly, that the gas circulation tube be a separate tube inserted within the frame assembly formed from a high conductivity high strength material such as a stainless steel alloy SUS, copper or aluminum. FIG. 5B and FIG. 5C respectively show a cross sectional view and a side view of a sub frame section with alternate configurations of gas flow tubes 603 in the frame 602. Internal fins 650 are shown in FIG. 5B; external fins 660 on the top surface of the frame element in FIG. 5C maintain the cooling conduit 603 therein. In FIG. 5D, a heat pipe 690 is the thermal conductive media for heat transfer to and from the tank 601. The heat pipe from the tank system is a further example whereby heat of the compressing refill gas may be transferred to a larger mass for dissipation. FIG. 5E and FIG. 5F show an example wherein the gas circulation pipe 603 is installed within a cavity 603a in the frame 602 interior and radiator fins are transverse to the frame [FIG. 5E] and parallel to the frame [FIG. 5F]. FIG. 5G illustrates a cross section of a sub frame assembly 700 with gas flow conduit therein 603 including a melting/solidifying media such as naphthalene 710 as a component of the heat exchange system packed in the frame interior cavity. See Gas Cooling Method Using a Melting/Solidifying Media for High Pressure Storage Tanks for Compressed Natural Gas or Hydrogen, Ser. No. 11/381,005 filed on May 1, 2003. In FIG. 5H, supplemental cooling conduits 711 and 712 convey cooling fluid from a supplemental cooler to the frame element sub system.

The cooling system management for a high pressure tank shown with reference to FIG. 6 involves separate elements of heat transfer: 1) absorption of heat in the gas as the gas passes through an in situ a heat absorbing media 61 as the gas circulates from the refill nozzle through the tank to a first cooling loop 63; and 2) utilization of the heat absorbent properties of the gas itself as the gas is circulated by a pump or other device 62 through the tank to a second cooling loop 64. The first cooling loop 63 and second cooling loop 64 may be separately (FIG. 2B) or jointly (FIG. 3A) interconnected to a radiator or other heat absorber system in the vehicle 65 which in turn may be interconnected with the main vehicle power plant system heat exchanger 66. Various combinations and permutations of the foregoing thermal interconnections are possible. In FIG. 6, temperatures and pressures in the tank; $PRESSURE_{TANK}$ and $TEMPERATURE_{TANK}$; in the first and second HEX loops; $PRESSURE_{LOOP}$ and $TEMPERATURE_{LOOP}$; in the subsystem; $PRESSURE_{SUBSYSTEM}$ and $TEMPERATURE_{SUBSYSTEM}$; and in the main cooling system; $PRESSURE_{MAIN}$ and $TEMPERATURE_{MAIN}$ are monitored and controlled by the vehicle control system 67 depending upon various parameters such as vehicle mode, refilling, decompression, driving, and parking, ambient temperature, tank pressure, volumetric gas flow and the like.

Figure 3D:
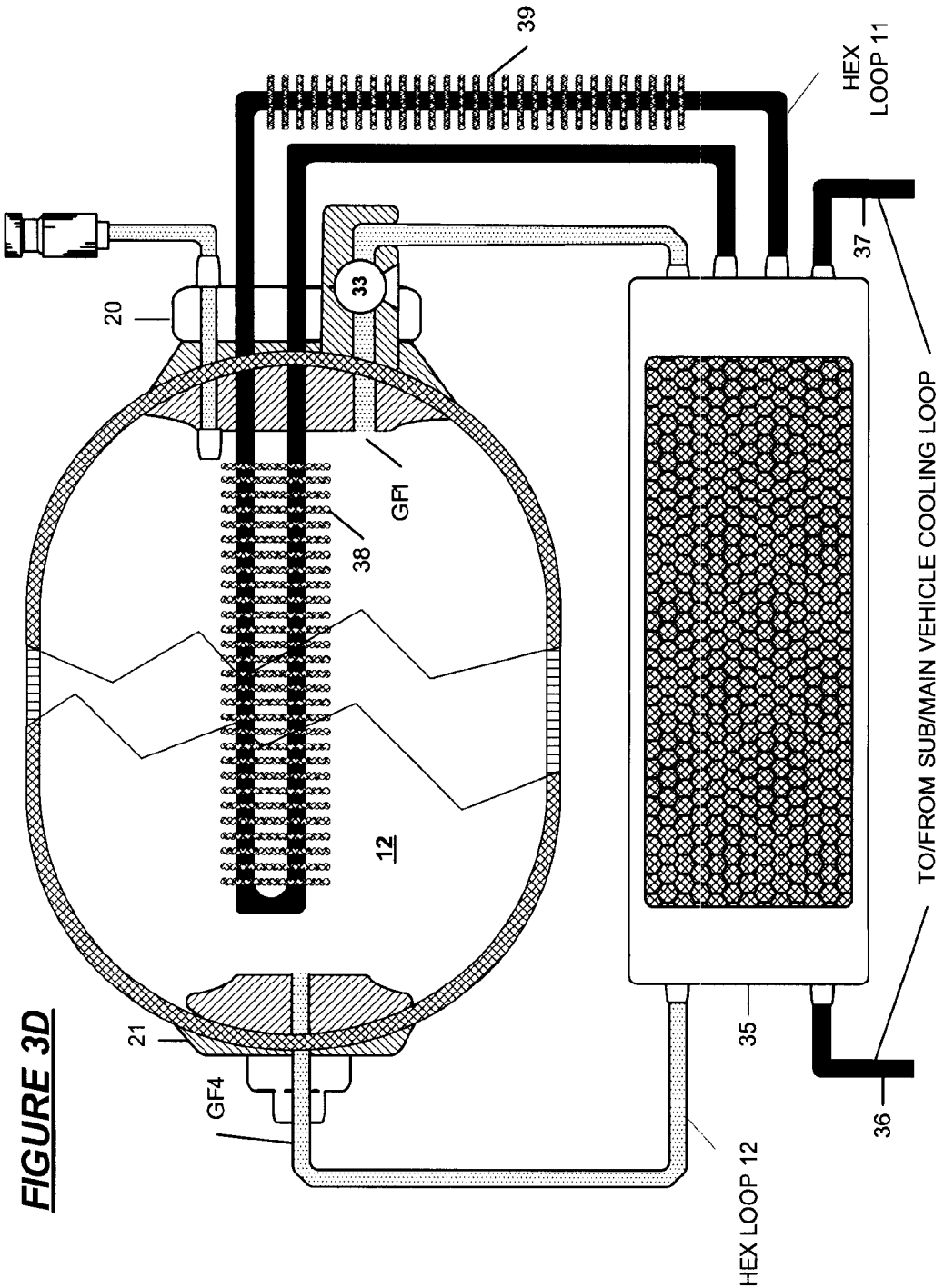
FIG. 3D shows an example of a secondary pump system in a configuration of FIG. 3A.

Control system 67 feeds back operating signals to system pumps $P_{1-N}$ and system valves $V_{1-N}$ depending on parameters sensed. In one example, the vehicle air conditioner may be utilized as a cooling sub system wherein, for example, with reference to FIG. 3A, the air conditioner cooling loop is thermally interconnected to conduits 36 and 37 to the vehicle sub system for cooling joint HE)( 35 that receives heat from both the in situ device and the gas circulation pump system. Similarly, a heat mass already cooled by the air conditioner, such as a water reservoir, coolant or frame element can be utilized as a heat sink for indirect cooling of the gas. In another example utilizing an air conditioner, the air conditioning fluid itself can be circulated within an in situ device 38 such as in FIG. 3D which may be either directly, or indirectly (shown) cooled in a loop 11 by the air conditioner heat exchanger 35 linked through cooling conduits 36 and 37 to a main or sub vehicle system. A second cooling system using the gas itself as the absorbent media pumps the gas by pump (Venturi or powered) 33 in a cooling loop 12. As also shown in FIG. 3D, a hybrid ambient air plus air conditioning system may also be used, wherein ambient air heat exchanger 39 pre cools the circulating fluid before the fluid enters the A/C subsystem. Likewise, the vehicle body or sub frame can be utilized as a cooling mass, interconnected with the tank cooling circuit as is the A/C system discussed above. (See FIGS. 5A through 5H.)

EXAMPLE II

Internal Warming

The aforementioned heat exchange techniques may also be utilized as internal gas warming methods for high pressure gas storage cylinders on CNG and hydrogen powered vehicles. As described above, the gas fuel tanks will typically include heat absorbing materials therein. During driving, the gas inside of the tanks may become cold, caused by a decrease in tank pressure wherein the heat absorbing materials in the tank will absorbs heat during the gas evacuation from the tank. In cold climates, the internal gas temperature in a tank may drop to an ambient temperature level, for example, −60 deg-C., a temperature that may be below the permissible operating temperature of O-rings or other rubber or thermoplastic seals utilized in the gas flow system seals, causing the stored gas to leak. The obverse application of the gas cooling systems described is to provide a technology which can warm the inside of tank during driving, thereby reducing the risk of a fuel gas leak in cold climate driving conditions. As a result, the tank durability will be increased because the internal temperature change of the stored gas and its effects on the tank's wall and sealing systems are reduced.

With reference to FIG. 7A, HEX Loop 1 includes 1) heat flow through a conductive fluid utilized, for example, in the main vehicle power plant or air conditioning subsystem HEX Loop 3, or 2) a heat pipe interconnection to the internal HEX device 71 from a warming system. In the latter instance, the flow will not be a loop, but is characterized as a thermally conductive interconnection. Thus the tank/gas warming HEX device may include a liner, a melting/solidifying material, a radiator/absorber, a frame system, exhausted heat from an air conditioner or power plant, heat from an internal vehicle heating system, and the like, all described above; however, utilized in the inverse as conveying heat into the tank for gas warming, in contrast to conveying heat from the tank for gas cooling. A heater/cooler may be included in a HEX loop as shown at 75. With reference to a control system shown in FIG. 7B, the heater 75 is regulated depending upon gas temperature sensed. When gas needs to be warmed in the tank, the heater is operated to warm the gas through the heat exchanger thereby increasing the efficiency of tank evacuation. A further benefit of providing an in line heater for gas warming in the tank is the incremental range extension of the fuel load as a warmed gas expands and increases in temperature, allowing more gas to be evacuated from the tank, compensating for gas cooling as the tank is depleted.

EXAMPLE III

Vehicle Operation

The various modes of vehicle operation are illustrated in the examples of FIG. 4A [refueling], FIG. 4B [driving] and FIG. 4C [parking]. In the refueling mode shown in FIG. 4A, tank boss or end cap port assembly 20 is provided at one end of the tank and includes embedded valve EV21, a one way check valve controlling gas flow GF1 into the tank from ejector pump 3. Boss or port assembly on the opposite end of the tank 21 includes, embedded therein, two switch valves, V2 and V3, and pressure regulator PR2. The switch valves and pressure regulator PR2 are interconnected in the gas flow conduit GF4 leading to the vehicle power plant through switched outlets from the tank GF2 and GF3. V2 and V3 may be combined into a single two way switch having the equivalent function. In the refuel mode, V1, leading to the power plant, is closed and the entry of gas from the nozzle 1 into the conduit 100 is allowed. Of the gas flow tubes associated with embedded valves and regulator EV21, V3 leading from pressure regulator PR2 is closed; gas flow GF2 from tank interior volume 12 passes through the open valve V2 to the tank exterior outlet GF4 to the external heat exchanger 7, inlet 6 and outlet 8, to the suction inlet of the ejector pump 3 which circulates the refueling gas to remove heat from the tank interior 12. As shown, the gas flow circuit passes through in situ HEX 200 then through external HEX 201 whereupon the gas is introduced into the ejector pump inlet, whereupon the gas circulates through the tank from GF2 through GF4 and through second exterior HEX 202 to the suction inlet of the ejector pump until refueling is complete.

FIG. 4B illustrates the driving mode wherein low pressure operation occurs in the gas conduit tubes during driving. V2 is closed. One way (check) valve EV20 is automatically closed because the ejector pump pressure is lower than pressure in the tank interior. There is no gas flow to the tank from the ejector pump 3. Valve V3 is switched open allowing gas to flow from GF3 through pressure regulator PR2 from the tank through the heat exchanger 7 and null state ejector pump 3 to the power plant through external HEX 201 and in situ HEX 200 to the power plant through open valve V1 and pressure regulator PR1. The flow conduit pressure $P_t$ shown reaches a predetermined value and is maintained at a uniform value depending upon the open or closed state of valve EV20. Heat is absorbed from ambient sources (or an auxiliary heater through an interrelationship with an external HEX) and released in the tank interior where heat will increase internal volume pressure. Utilization of the lower pressure results and is preferred over using high pressure in the gas conduit tubes. FIG. 4C illustrates the parking mode when all tank valves are closed.

The external heat exchangers and the in situ heat exchanger may be in the form of a radiator and may include fins, pins, plates, wave shaped radiators, mesh, corrugation like elements, or other like devices having high thermal conductivity and high surface area per unit volume or weight, allowing for the maximum thermal efficiency with regard to heat absorbed and heat radiated as described in my co-pending applications. A melting/solidifying thermally conductive media, such as naphthalene, may also be employed. The heat sink and radiator are each operatively disposed with regard to a fluid conduit system, or interconnected by a heat pipe, for the transfer of captured heat. Entropic flow of energy is from hot to cool. The fluid flow in the conduit system that is encompassed by the heat sink or radiator, in an example, is in a continuous fluid loop, from the hot tank interior where the gas captures heat—to the radiator where conduit fluid is cooled—returning to the tank interior to begin the heat absorption/heat radiation cycle anew, or vice versa.

A fan or blower may be operatively disposed with respect to the heat exchanger—operatively dependent on factors such as radiator capacity, rate of heat transfer to the heat sink and the radiator, temperature of heat transferred, fan or blower (cubic feet per minute (cfm)) capacity effective at the radiator, temperature of the ambient external environment, and the like. A control system For the fan and or pump may be configured to interrelate the foregoing factors and determine appropriate fan and or pump speed, on and off timing, and the like.

As with my previous applications noted above, the system is adaptable to multiple tanks and a vehicle control system providing selectable or controllable inlet valves and selectable or controllable outlet valves for the tanks and the coolant system operatively interconnected with a control means, logic circuit, or CPU on the vehicle. The vehicle control system also monitors pressure and/or temperature or other sensing means associated with the tanks or their inlet and outlet lines, the cooling fluid circulation lines, and the fluid pump and/or and may be adapted to control vehicle operation accordingly. Specific control configurations and parameters, and sensors, valve locations and systems in accordance with the principles of the invention are preferably based on overall vehicle design considerations. For example, pressure, temperature and other sensors and controls may be provided to monitor tank and/or line pressures and temperatures, to start, stop and adjust fluid flow, fan speed and duration, and other parameters associated with a proper operating protocol of the ejector pump and vehicle tank or valve system for refilling and consumption of pressurized fuel in the course of vehicle operation.

With reference to the embodiments discussed above as examples. Thus there is provided an apparatus wherein the compression heat of refueling of a high pressure storage tank is evacuated from the interior of the tank in which a gas circulating within the tank passes through an ejector pump powered by the mechanical energy of the refueling gas as the gas traverses from the high pressure refuel depot to the storage tank and the circulating gas absorbs the refueling heat and carries the heat to a cooling system before the gas is introduced into the tank for storage.

In all instances described herein, it is assumed that during the state of refueling, the outlet valves for each tank are closed; and during the instance of consumption, the inlet valves for each tank are closed and the cooling fluid correspondingly circulated in a manner typically monitored and controlled by a vehicle operation system. The on board vehicle tank system may include a plurality of on board tanks that may have a filling sequence wherein all tanks are filled in parallel simultaneously or all tanks are filled separately in a series order essentially one at a time.

Having described the invention in detail, those skilled in the art will appreciate that, given the present description, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

The invention claimed is:

1. A system for heat exchange for a high pressure gas storage tank in a vehicle wherein 1) a fuel gas circulates within the tank and such circulation produces a heat transfer selected from the group consisting of absorption to and radiation from the gas resulting from compression and expansion of gas stored in the tank, the heat transfer depending upon the mode of operation of the vehicle, 2) the gas circulated through a heat exchanger external to the tank whereby a second heat transfer selected from the group consisting of absorption to and radiation from the gas to an environment external to the tank, and 3) an in situ heat exchange device installed within the tank that provides a heat transfer selected from the group consisting of absorption to and radiation from the gas stored in the tank as a result of heat exchange through a unit external to the tank.

2. The system of claim 1 including a pump interconnected in a closed circuit conduit system from the tank to the external heat exchanger.

3. The system of claim 2 wherein the pump is a Venturi pump.

4. The system of claim 1 wherein the in situ heat exchange device installed within the tank comprises a closed fluid flow circuit from the tank to an external radiator.

5. The system of claim 1 comprising a heat pipe for conducting heat to and from gas in the tank.

6. The system of claim 1 wherein the external heat exchanger is selected from at least one of a radiator, a heat sink and a coolant media.

7. The system of claim 6 wherein the external heat exchanger is thermally interconnected with an auxiliary blower system.

8. The system of claim 1 wherein the external heat exchanger includes a fluid flow circuit passing through a radiator that is thermally interconnected with one of the vehicle power plant thermal system or a vehicle heating and cooling sub system.

9. A system in accordance with claim 1 wherein the heat exchanger comprises 1) a configuration of heat disposing elements on a vehicle frame assembly and 2) a fluid circulation loop within vehicle frame assembly proximate the heat disposing elements.

10. A heat exchange system for a high pressure fuel gas storage tank in a vehicle comprising:
   a fuel storage tank,
   a heat exchanger inside the storage tank,
   a heat exchanger external to the storage tank,
   a gas flow circuit directing gas from an inlet 1) through the internal heat exchanger, 2) to
   an inside tank volume, and 3) to the external heat exchanger; wherein:
      a) fuel gas circulates within the inside of the tank and through the inside heat exchanger and the circulating gas absorbs heat from compression of the gas as the storage tank is refilled and the flow circuit directs the gas to the external heat exchanger, where heat is absorbed and exhausted and the circuit returns cooled gas to the inside of the tank as the tank is being refilled; and
      b) as gas in the tank is exhausted to power the vehicle, gas circulates from the inside of the tank to the external heat exchanger where heat is absorbed and the circuit directs the gas through the inside heat exchanger where the heat is radiated to warm the gas in the inside of the tank as heated gas is directed to a power source for the vehicle.

11. A system for heat exchange for an on board high pressure fuel gas storage tank installed in a vehicle comprising:
   1) a fuel tank having an internal heat exchanger;
   2) an external heat exchanger;
   3) the fuel tank, the internal heat exchanger and the external heat exchanger interconnected in a continuous gas flow circuit having an inlet into the circuit capable of being switched on or off and having an outlet from the circuit capable of being switched on or off;
   4) the circuit directing fuel gas through the interconnected fuel tank, the internal heat exchanger and the external heat exchanger, and, depending upon a mode of operation of the vehicle, the gas being circulated, respectively, a) when the vehicle tank is being refilled, through the interior of the tank to absorb heat created by compression of the gas as the gas is introduced into the tank when the tank is being refilled, and b) through the interior of the tank to warm the gas therein as the gas cools as the gas pressure lowers when the gas is exhausted from the tank for use as fuel for the vehicle, 5) the external heat exchanger, a) when the vehicle tank is being refilled, exhausting to the external environment the heat of compression absorbed by the gas as the gas is introduced into the tank; and b) when the gas is being exhausted from the tank for use as fuel for the vehicle, absorbing heat from the external environment and transferring the absorbed heat to the gas and directing the heated gas into the tank interior through the gas flow circuit to warm the gas remaining in the tank to compensate for the cooling of the gas as pressure in the tank is lowered when the gas is exhausted.

12. An on board vehicle tank system in accordance with any one or more of claim 1 or claim 11 or claim 10 including a plurality of on board tanks.

13. The system of claim 10 including a pump interconnected in the circuit.

14. The system of claim 13 wherein the pump is a Venturi pump.

15. The system of claim 10 wherein the external heat exchanger is selected from at least one of a radiator, a heat sink and a coolant media.

16. The system of claim 10 wherein the external heat exchanger is thermally interconnected with an auxiliary blower system.

17. The system of claim 10 wherein the external heat exchanger includes a fluid flow circuit passing through a radiator that is thermally interconnected with one of the vehicle power plant thermal system or a vehicle heating and cooling sub system.

18. The system of claim 10 wherein the heat exchanger comprises 1) a configuration of heat disposing elements on a vehicle frame assembly and 2) a fluid circulation loop within vehicle frame assembly proximate the heat disposing elements.

* * * * *